(12) United States Patent
Atsumi (10) Patent No.: US 7,469,671 B2
(45) Date of Patent: Dec. 30, 2008

(54) AIR-INTAKE DUCT AND MOTORCYCLE COMPRISING THE SAME

(75) Inventor: Ryosuke Atsumi, Akashi (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 0 days.

(21) Appl. No.: 11/496,967

(22) Filed: Jul. 31, 2006

(65) Prior Publication Data

US 2007/0028884 A1 Feb. 8, 2007

(30) Foreign Application Priority Data

Aug. 3, 2005 (JP) .............................. 2005-225773

(51) Int. Cl.
*F02M 35/10* (2006.01)
(52) U.S. Cl. .............................. 123/184.53; 123/184.21
(58) Field of Classification Search ............ 123/184.53, 123/184.21
See application file for complete search history.

(56) References Cited

U.S. PATENT DOCUMENTS 4,418,676 A * 12/1983 Iwao ..................... 123/184.32
4,838,909 A * 6/1989 Bidanset ..................... 55/385.7
5,549,724 A * 8/1996 Mochida ....................... 55/521

FOREIGN PATENT DOCUMENTS

| JP | 05306659 A | * 11/1993 |
| JP | 2578094 | 11/1996 |
| JP | 09-021354 | 1/1997 |

* cited by examiner

*Primary Examiner*—Noah Kamen
(74) *Attorney, Agent, or Firm*—Alleman Hall McCoy Russell & Tuttle LLP (57) ABSTRACT

An air-intake duct through which air taken in from outside is guided to an air flow rate control device configured to control an amount of air flow that is supplied to an engine of a vehicle, including a pipe-shaped portion that is coupled to the flow rate control device and has an air-intake passage formed therein, a chamber portion that is located upstream of the air-intake passage of the pipe-shaped portion in the air flow and has an inner diameter larger than an inner diameter of the pipe-shaped portion, and an extended pipe-shaped portion configured to extend continuously from the pipe-shaped portion so as to protrude into an inner space of the chamber portion, the extended pipe-shaped portion forming an extended passage connected to the air-intake passage of the pipe-shaped portion.

15 Claims, 7 Drawing Sheets

AIR-INTAKE DUCT AND MOTORCYCLE COMPRISING THE SAME

TECHNICAL FIELD

The present invention relates to an air-intake duct through which air taken in from outside is guided to a flow rate control device configured to control an amount of the air that is supplied to an engine of a vehicle, and to a motorcycle comprising the air-intake duct.

BACKGROUND ART

In motorcycles, air is cleaned by an air cleaner element and is guided to a carburetor through an air-intake duct, and an air-fuel mixture is generated in the carburetor and is fed to a cylinder of an engine (see e.g., Japanese Patent No. 2578094). Exemplary air-intake ducts are an air-intake duct having a passage inner diameter that does not substantially vary in an axial direction thereof, and a funnel-shaped air-intake duct having a passage inner diameter that increases toward an air cleaner (see Japanese Laid-Open Patent Application Publication No. Hei. 9-21354). The funnel-shaped air-intake duct includes a pipe-shaped portion that is coupled to a carburetor and has a passage inner diameter that does not substantially vary, and a chamber portion that extends continuously from the pipe-shaped portion so as to increase an inner diameter and is coupled to an air cleaner element.

In the air-intake duct, the pipe-shaped portion is required to have a length sufficient to inhibit occurrence of a turbulent flow to enable air taken in to be supplied smoothly to the engine, whereas the chamber portion is required to have a large volume to reduce an abrupt negative pressure that tends to be generated in the interior of the air-intake duct to thereby improve, for example, responsiveness to an acceleration operation, during acceleration of the motorcycle.

Since a number of components are mounted in a limited space of the motorcycle, the distance between the carburetor and the air cleaner is small, and correspondingly, the whole length of the air-intake duct disposed therebetween is limited. In addition, since a frame member, a rear suspension, etc. are arranged near a space in which the air-intake duct is disposed, the shape of the air-intake duct is limited. Under these conditions, if the length of the pipe-shaped portion is made sufficiently large, then the volume of the chamber portion continuous therewith becomes small, whereas if the volume of the chamber portion is made sufficiently large, then the length of the pipe-shaped portion becomes small. For these reasons, it is difficult to enable both the pipe-shaped portion and the chamber portion to suitably perform their functions.

SUMMARY OF THE INVENTION

The present invention addresses the above described conditions, and an object of the present invention is to provide an air-intake duct including a pipe-shaped portion having a sufficient length and a chamber portion having a sufficient volume in a limited internal space of a motorcycle.

According to one aspect of the present invention, there is provided an air-intake duct through which air taken in from outside is guided to an air flow rate control device configured to control an amount of air flow that is supplied to an engine of a vehicle, the air-intake duct comprising a pipe-shaped portion that is coupled to the flow rate control device and has an air-intake passage formed therein; a chamber portion that is located upstream of the air-intake passage of the pipe-shaped portion in the air flow and has an inner diameter larger than an inner diameter of the pipe-shaped portion; and an extended pipe-shaped portion configured to extend continuously from the pipe-shaped portion so as to protrude into an inner space of the chamber portion, the extended pipe-shaped portion forming an extended passage connected to the air-intake passage of the pipe-shaped portion.

In accordance with the above construction, since the extended pipe-shaped portion having an inner-diameter that is smaller than that of the chamber portion extends continuously from the pipe-shaped portion so as to protrude in the interior of the chamber portion, the length of the air-intake passage with a smaller diameter can be made sufficiently long to inhibit turbulent air flow, and thus the air can be supplied to the engine smoothly during low-speed running of the vehicle, even when it is difficult to obtain a sufficient whole length of the air-intake duct because a space located upstream of the flow rate control device is limited. In addition, the chamber portion externally wraps the extended-pipe shaped portion to make a volume of the chamber portion large. In this construction, an abrupt negative pressure that tends to be generated in the interior of the air-intake duct can be reduced and responsiveness to the acceleration operation or the like can be improved during acceleration of the vehicle. Therefore, the pipe-shaped portion and the chamber portion are able to function effectively even in a limited space. As used herein, the term "flow rate control device" includes, for example, a throttle valve in a case where a fuel is injected into a cylinder of an engine or an air-intake passage, in addition to a carburetor.

The chamber portion may be continuous with and integral with the pipe-shaped portion, and an inlet end portion of the chamber portion may be connected to an air outlet of an air cleaner element. In this construction, an air-intake device can be made compact. In addition, the air that has passed through the air cleaner element and has been thereby cleaned smoothly flows into the air-intake duct including the chamber portion and the pipe-shaped portion that are formed of a unitary one piece.

The extended pipe-shaped portion may be of a funnel-shape that increases a diameter toward an opening end thereof. In this construction, the air is guided smoothly from the chamber portion to the pipe-shaped portion through the extended pipe-shaped portion, thus decreasing air-intake resistance.

A part of the extended pipe-shaped portion may be continuous with an inner surface of the chamber portion. Since a part of the inner surface of the chamber portion forms a wall face defining an air-intake passage formed by the extended pipe-shaped portion, the extended pipe-shaped portion can be formed to have a sufficient diameter even when the shape of the air-intake duct is limited, because of the limited space. Furthermore, since a part of the extended pipe-shaped portion is directly connected to the chamber portion, stiffness of the extended pipe-shaped portion can be improved.

A rib may be provided between the inner surface of the chamber portion and an outer surface of the extended pipe-shaped portion. The rib is able to effectively inhibit deformation of the chamber portion when the duct is formed of a flexible material such as rubber and the abrupt negative pressure is generated in the chamber portion during acceleration of the vehicle.

The pipe-shaped portion may have a second air-intake passage that is configured to open in a space formed between the chamber portion and the extended pipe-shaped portion and is connected to the air flow rate control device. In this construction, the second air-intake passage connected to the flow rate control device can be easily formed in the air-intake duct.

The chamber portion may be continuous with and integral with the pipe-shaped portion and an inlet end portion of the chamber portion may be connected to an air outlet of an air cleaner box that accommodates an air cleaner element. In this construction, the air that has passed through the air cleaner element and has been thereby cleaned flows smoothly into the air-intake duct including the chamber portion and the pipe-shaped portion that are formed of the unitary one piece.

The pipe-shaped portion may include a plurality of pipe-shaped portions that are configured to branch from the chamber portion and are coupled to a plurality of air flow rate control devices, and the extended pipe-shaped portion may include a plurality of extended pipe-shaped portions protruding into an inner space of the chamber portion. With such a construction, functions of the pipe-shaped portion and the chamber portion can be performed effectively by using only one air-intake duct in a case where the air taken in is supplied to the plurality of air flow control devices in, for example, a motorcycle equipped with an in-line four-cylinder engine.

According to another aspect of the present invention, there is provided a motorcycle comprising an air-intake duct coupling a flow rate control device to an air cleaner to allow air taken in from outside to be guided from the air cleaner to the air flow control device, the flow rate control device being configured to control an amount of the air that is supplied to an engine, the air-intake duct including a pipe-shaped portion that is coupled to the flow rate control device and has an air-intake passage formed therein; a chamber portion that is located upstream of the air-intake passage of the pipe-shaped portion in air flow and has an inner diameter larger than an inner diameter of the pipe-shaped portion; and an extended pipe-shaped portion configured to extend continuously from the pipe-shaped portion so as to protrude into an inner space of the chamber portion, the extended pipe-shaped portion forming an extended passage connected to the air-intake passage of the pipe-shaped portion.

The air-intake duct may be formed as a unitary one-piece component made of elastomer resin.

The above and further objects and features of the invention will more fully be apparent from the following detailed description with reference to accompanying drawings.

DETAILED DESCRIPTION OF THE PREFERRED EMBODIMENTS

Hereinafter, a first embodiment of a motorcycle of the present invention will be described with reference to the accompanying drawings. As used herein, directions are defined from the perspective of a rider (not shown) straddling the motorcycle.

Figure 1:
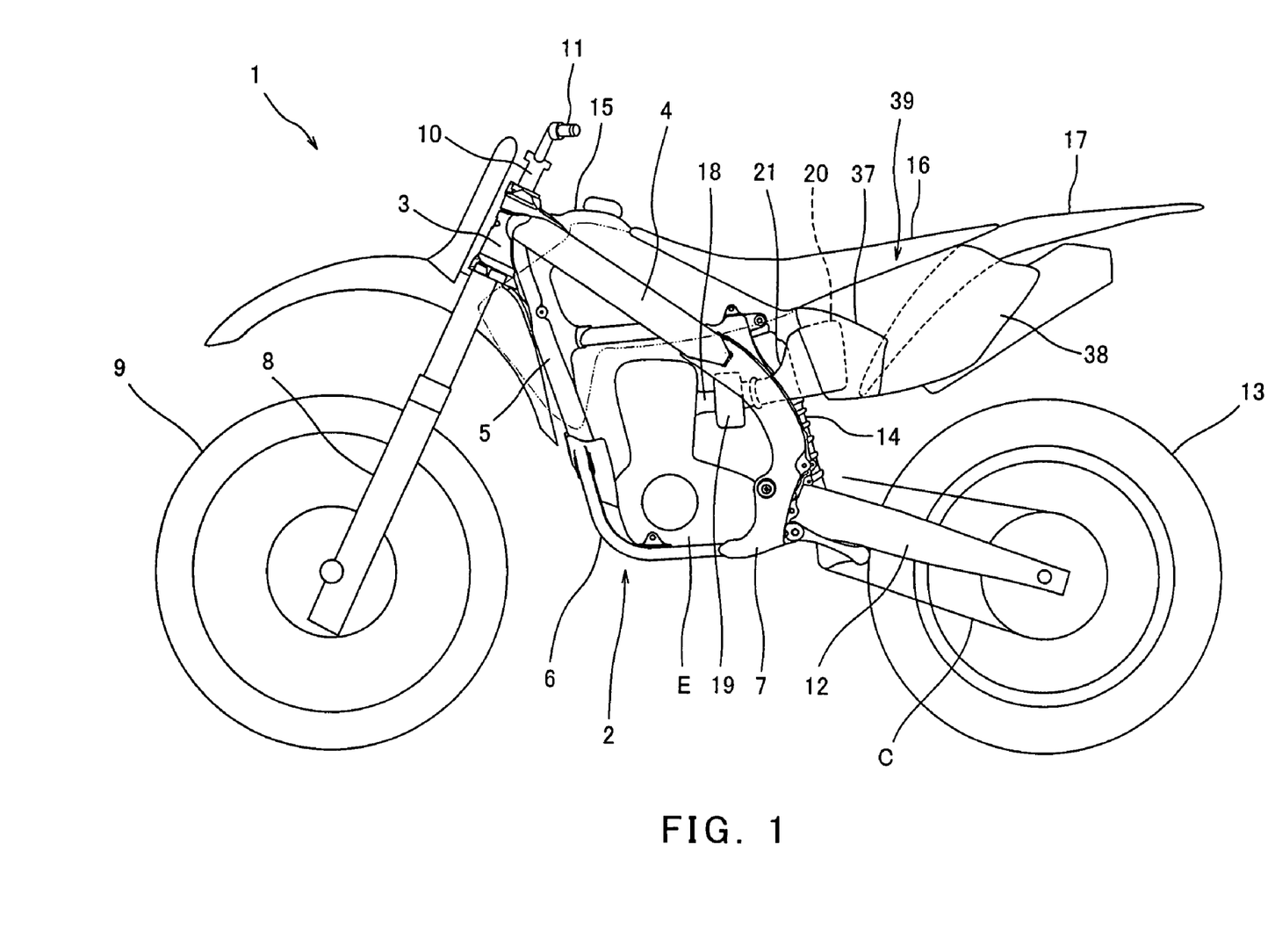
FIG. 1 is a side view of a motorcycle according to a first embodiment of the present invention.

FIG. 1 is a side view of a motorcycle 1 (vehicle) according to the first embodiment of the present invention. Turning now to FIG. 1, the motorcycle 1 includes a front fork 8 extending substantially vertically with a predetermined caster angle. A front wheel 9, which is a steering wheel, is rotatably mounted to a lower portion of the front fork 8. A lower portion of the steering shaft 10 extending substantially vertically is coupled to an upper portion of the front fork 8. A bar-type steering handle 11 is attached to an upper portion of the steering shaft 10. The steering shaft 10 is rotatably mounted to a head pipe 3 forming a frame 2 of the motorcycle. The front wheel 9 is steered by the rider's operation of rotating the steering handle 11 to the right or to the left.

The frame 2 includes the head pipe 3 and a pair of right and left main pipes 4 extending rearward to be tilted slightly downward from an upper portion of the head pipe 3. An upper portion of a down tube 5 extending downward and slightly rearward is coupled to a lower portion of the head pipe 3. A lower pipe 6 extends from a lower portion of the down tube 5 to be curved substantially in L-shape in a side view. A rear portion of each main pipe 4 is coupled to a rear portion of the lower pipe 6 by each of a pair of right and left swing arm brackets 7. A swing arm 12 extends substantially forward and rearward and is mounted to the swing arm bracket 7 so as to be vertically pivotable around a front end portion thereof. A rear wheel 13, which is a drive wheel, is rotatably mounted to a rear portion of the swing arm 12. A rear suspension 14 is mounted between the swing arm 12 and an upper portion of the swing arm bracket 7 and is configured to extend through a region substantially vertically between the right and left swing arm brackets 7. The main pipes 4, the lower pipe 6, and the like are not limited to pipe-shaped members so long as they form the frame 2.

An engine E is mounted in a space defined by the head pipe 3, the main pipes 4, the down tube 5, the lower pipes 6, and the swing arm brackets 7, which form the frame 2, and is secured to respective portions of the frame 2. A carburetor (flow rate control device) 19 is coupled to a rear portion of the engine E through a pipe-shaped cab holder 18 extending rearward. An air-intake duct 21 is coupled to a rear portion of the carburetor 19 and extends rearward between the swing arm bracket 7 and the rear suspension 14. An air cleaner element 20 is coupled to a rear portion of the air-intake duct 21. The air cleaner element 20 is accommodated within an air cleaner holding frame 37 mentioned later. A side cover 38 is mounted behind and continuously with the air cleaner holding frame 37.

A drive force is transmitted from an output shaft (not shown) of the engine E to the rear wheel 13 through a chain C, thereby generating power to move the motorcycle 1. A fuel tank 15 is disposed above the main pipes 4. A seat 16 which is straddled by the rider is disposed behind the fuel tank 15. A rear fender 17 is mounted behind and in proximity to the air cleaner element 20 located below the seat 16. The seat 16, the rear fender 17, the air cleaner holding frame 37, and the side cover 38 form an air cleaner box 39 to surround the air cleaner element 20. Air in the interior of the air cleaner box 39 is suctioned into the air cleaner element 20 and cleaned therein. The resulting clean air flows through the air-intake duct 21, the carburetor 19, and the cab holder 18, in this order, and is supplied to the engine E. Alternatively, instead of the air cleaner box 39, a general air cleaner that accommodates an air cleaner element in the interior of an air cleaner box formed of a unitary one piece may be used.

Figure 2:
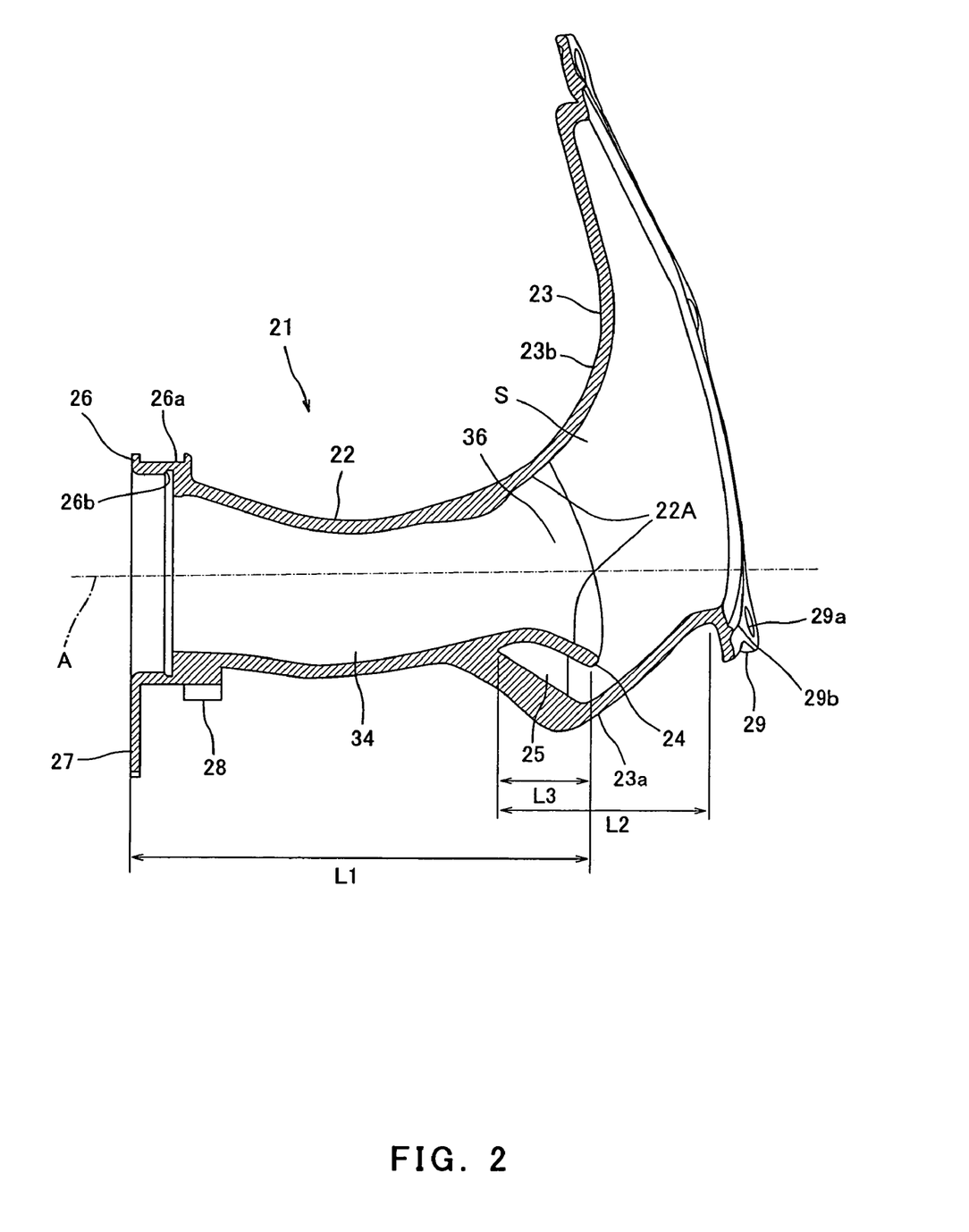
FIG. 2 is a cross-sectional view of an air-intake duct of the motorcycle of FIG. 1, as viewed from above.
Figure 3:
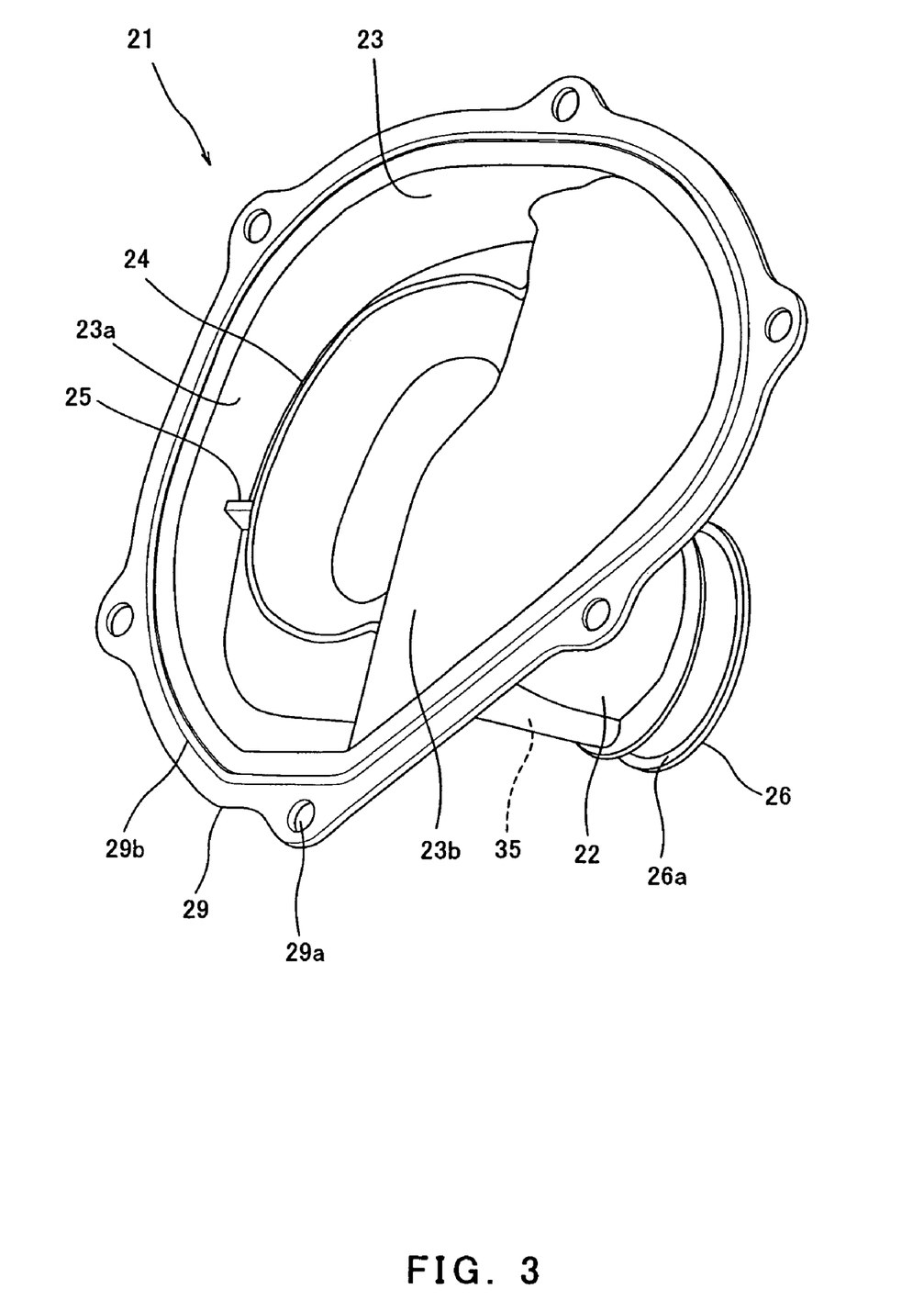
FIG. 3 is a perspective view of the air-intake duct of the motorcycle of FIG. 1.

FIG. 2 is a cross-sectional view showing the air-intake duct 21 of the motorcycle 1 as viewed from above. FIG. 3 is a perspective view of the air-intake duct 21 of the motorcycle 1. As shown in FIGS. 2 and 3, the air-intake duct 21 is formed of a unitary one-piece component made of a flexible material, for example, elastomer resin. The air-intake duct 21 includes a pipe-shaped portion 22 coupled to the carburetor 19 (see FIG. 1) located forward, a chamber portion 23 that is configured to extend continuously from the pipe-shaped portion 22 so as to have an inner diameter increasing rearward and is coupled to the air cleaner element 20 (see FIG. 1) located rearward, and an extended pipe-shaped portion 22A that is configured to extend from the pipe-shaped portion 22 so as to protrude into an inner space S of the chamber portion 23. The extended pipe-shaped portion 22A serves to extend a length of a main passage 34 of the pipe-shaped portion 22 rearward to L1.

The pipe-shaped portion 22 has a substantially equal diameter along a length thereof. A band attachment annular concave portion 26a is formed on an outer peripheral surface of a connecting end portion 26 connected to the carburetor 19. A carburetor engagement annular groove 26b is formed on an inner peripheral surface of the connecting end portion 26. A retaining tongue portion 27 is formed at a front portion of the outer peripheral surface of the connecting end portion 26 so as to protrude radially outward. A positioning protrusion 28 is formed at a rear portion of the outer peripheral surface of the connecting end portion 26 and is configured to contact a part of a band to be wound around the annular concave portion 26a.

The chamber portion 23 is asymmetric with respect to a center axis direction A of an air-intake passage of the connecting end portion 26 by which the pipe-shaped portion 22 is coupled to the carburetor 19. To be specific, the chamber portion 23 includes an expanded portion 23a that increases an inclination angle of a wall face with respect to the center axis direction A toward the air cleaner element 20 located rearward, and that then decreases in inclination angle, and a funnel portion 23b that fans or funnels outward to increase in diameter by gradually increasing an inclination angle of the wall face with respect to the center axis direction A. A flange 29 is formed at a connecting end of the chamber portion 23, which is connected to the air cleaner element 20. A seal lip 29b is formed at an end face of the flange 29 on the air cleaner element 20 side to extend and protrude over an entire periphery thereof. A plurality of mounting holes 29a into which fastener members (not shown) are inserted are formed at desired locations of the flange 29, which are outward of the seal lip 29b.

The extended pipe-shaped portion 22A is of a funnel shape that gradually increases in an inner diameter toward its opening end (rear end). A gap is formed between the expanded portion 23a of the chamber portion 23 and the extended pipe-shaped portion 22A. A length L3 of the extended pipe-shaped portion 22A that protrudes into the inner space S of the chamber portion 23 in the center axis direction A is shorter than a length L2 of the chamber portion 23 in the center axis direction A. To be specific, the length L3 is 20 to 70%, desirably, 30 to 60% of the length L2. In this embodiment, the extended pipe-shaped portion 22A includes an extended inner wall portion 24 that protrudes from a rear end of the pipe-shaped portion 22 into the inner space S of the chamber portion 23 and an inner wall surface of the chamber portion 23. That is, a part of the extended inner wall portion 24 is continuous with an inner surface of the funnel portion 23b of the chamber portion 23. In other words, the extended inner wall portion 24 and a part of the inner wall surface of the chamber portion 23 form a funnel-shaped extended passage 36 configured to extend the main passage 34 of the pipe-shaped portion 22 rearward in the interior of the chamber portion 23. It should be appreciated that the extended inner wall portion 24 may be pipe-shaped and the funnel-shaped extended passage 36 may be formed only by the extended inner wall portion 24, depending on a shape of the chamber portion 23.

Figure 4:
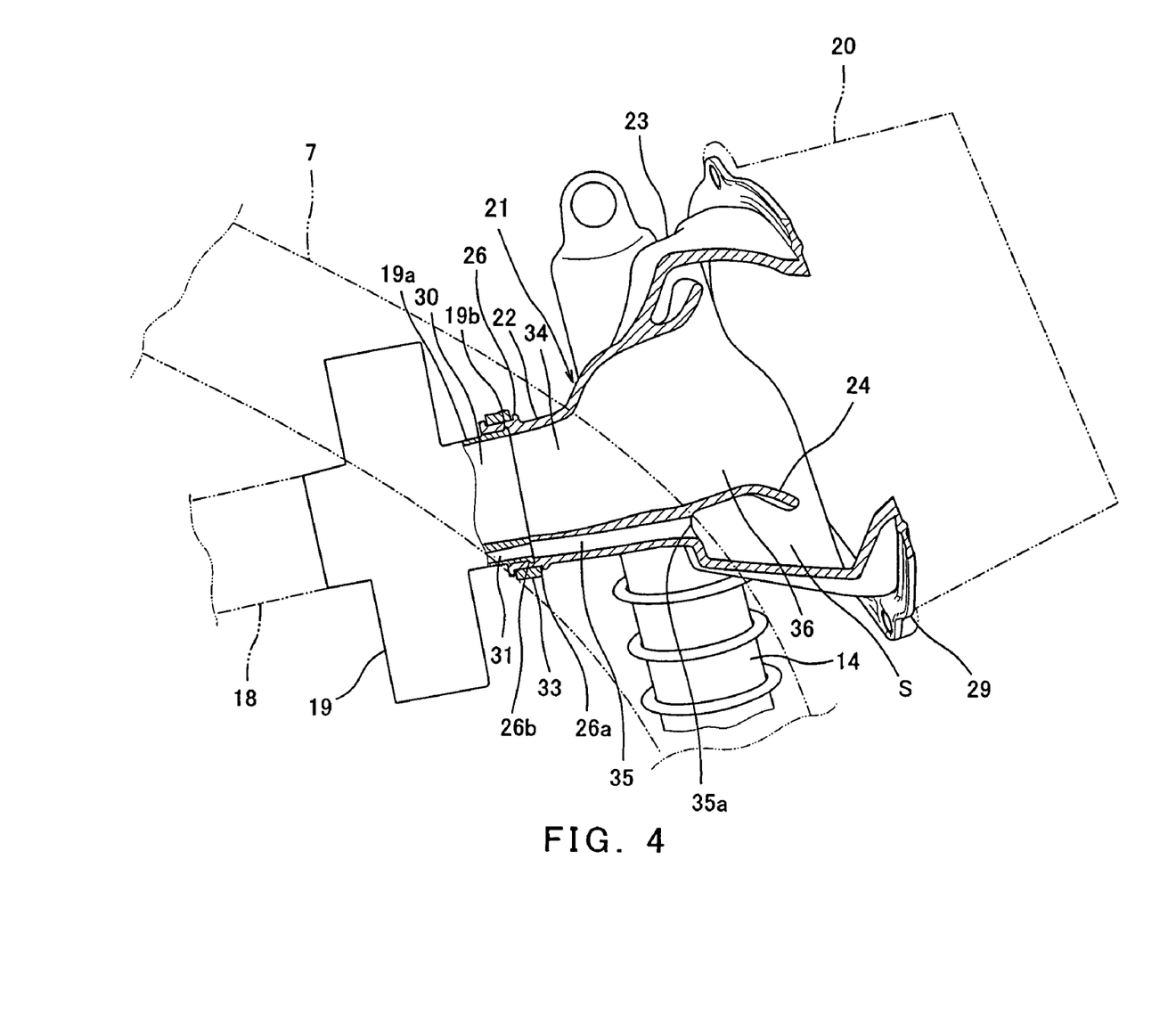
FIG. 4 is a cross-sectional view showing a region surrounding the air-intake duct of the motorcycle of FIG. 1, as viewed from a side.

A reinforcement rib 25 is provided in a gap formed between an inner surface of the expanded portion 23a of the chamber portion 23 and an outer surface of the extended inner wall portion 24. A length of the rib 25 in the center axis direction A is shorter than the length L3 of the protruding portion of the extended inner wall portion 24, but may be equal to the length L3. As shown in FIG. 4, a sub-passage 35 (second air-intake passage) extends under the main passage 34 of the pipe-shaped portion 22. An upstream opening 35a of the sub-passage 35 opens in a space formed between the extended inner wall portion 24 and the chamber portion 23. Through the sub-passage 35, air for vaporizing a fuel is supplied to the carburetor 19.

Figure 5:
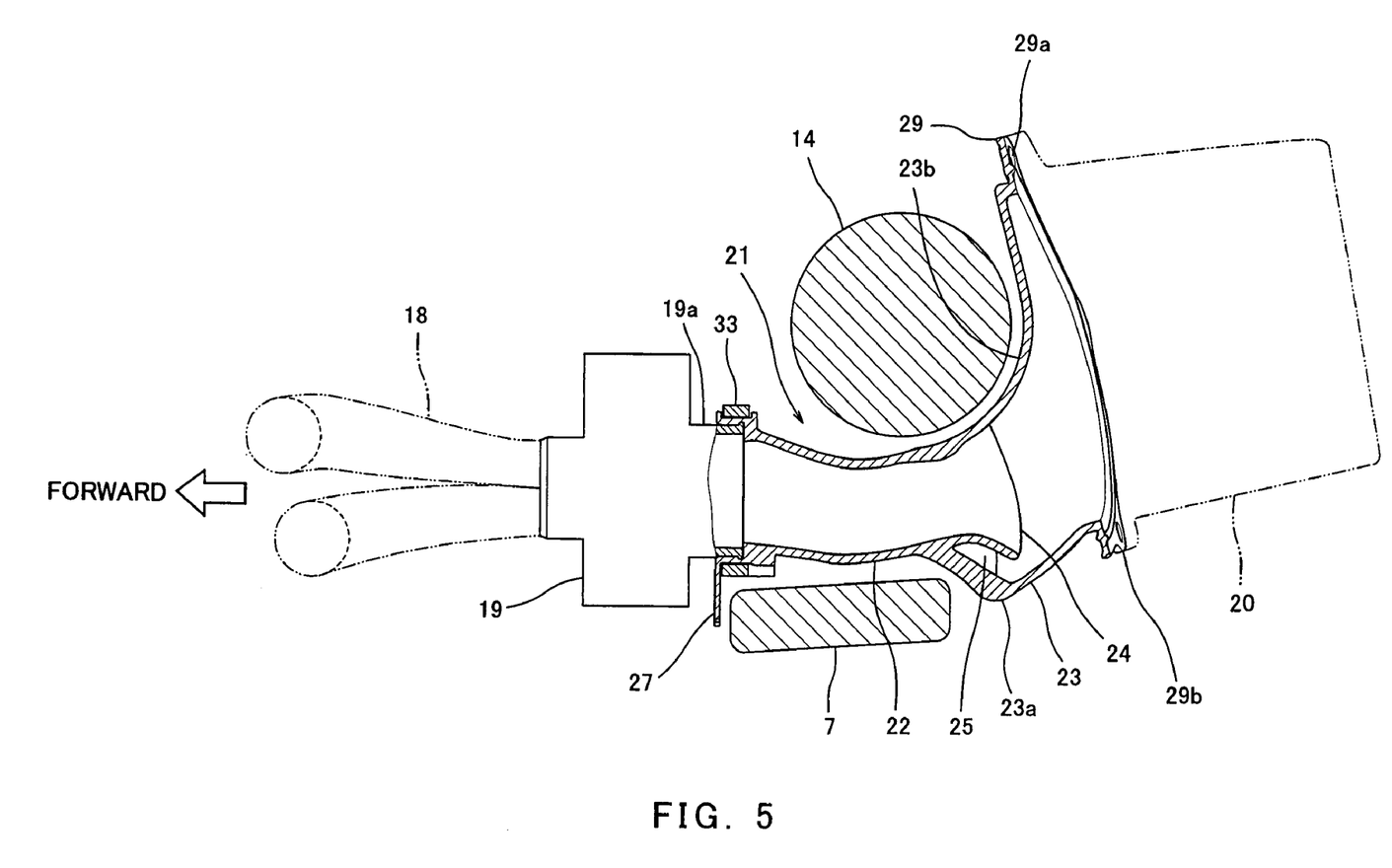
FIG. 5 is a cross-sectional view showing a region surrounding the air-intake duct of the motorcycle of FIG. 1, as viewed from above.

FIG. 4 is a cross-sectional view showing a region surrounding the air-intake duct 21 of the motorcycle of FIG. 1 as viewed from a side. FIG. 5 is a cross-sectional view showing a region surrounding the air-intake duct 21 of the motorcycle of FIG. 1 as viewed from above. As shown in FIG. 5, the air-intake duct 21 is disposed in a space formed between the right rear suspension 14 and the left swing arm bracket 7. The air-intake duct 21 is disposed to conform in shape to the rear suspension 14 with the funnel portion 23b of the chamber portion 23 oriented rightward. As shown in FIG. 4, the connecting end portion 26 on a front end side of the pipe-shaped portion 22 is externally fitted to an upstream tubular portion 19a of the carburetor 19. A flange portion 19b is formed at a rear end of the upstream tubular portion 19a to protrude radially outward and is in engagement with the annular groove 26b of the air-intake duct 21. In this state, the main passage 34 of the pipe-shaped portion 22 is connected to a main passage 30 of the carburetor 19, the sub-passage 35 of the pipe-shaped portion 22 is connected to a sub-passage 31 through which the air for vaporizing the fuel is supplied to the carburetor 19, a band 33 is wound around and fastened to the annular concave portion 26a of the connecting end portion 26 of the air-intake duct 21, and the pipe-shaped portion 22 of the air-intake duct 21 is fastened to the carburetor 19.

Figure 6:
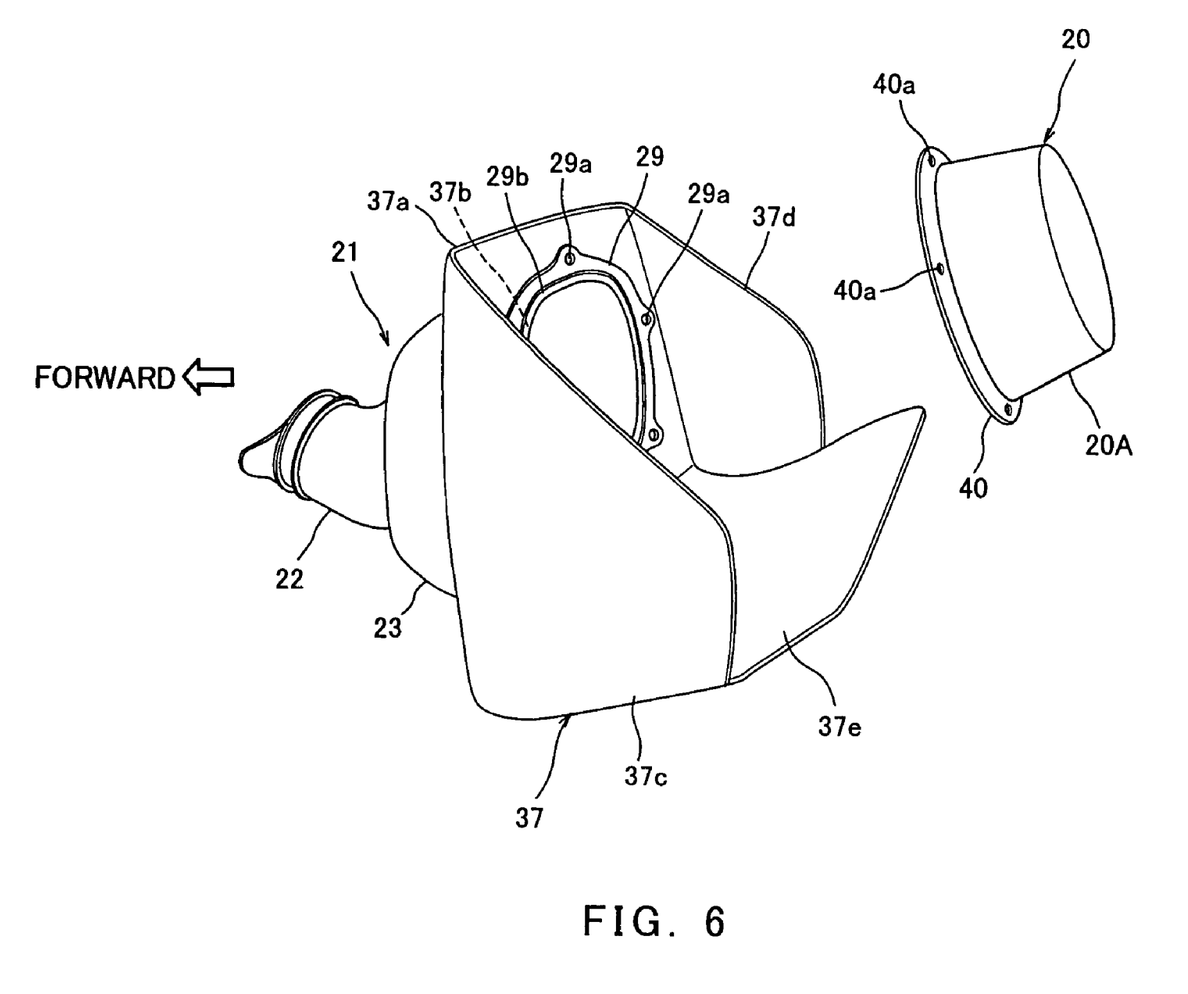
FIG. 6 is a perspective view showing a relationship between the air-intake duct and an air cleaner element of the motorcycle of FIG. 1.

FIG. 6 is a perspective view showing a relationship between the air-intake duct 21 and the air cleaner element 20 of the motorcycle 1 of FIG. 1. As shown in FIG. 6, the flange portion 29 of the chamber portion 23 of the air-intake duct 21 is attached to the air cleaner holding frame 37, and the air cleaner element 20 is attached to the air cleaner holding frame 37 with the flange portion 29 interposed therebetween. To be specific, the air cleaner holding frame 37 has a front wall portion 37a having an opening 37b. A left wall portion 37c and a right wall portion 37d of the air cleaner holding frame 37 respectively protrude rearward from right and left ends of the front wall portion 37a. A bottom wall portion 37e is connected to lower ends of the front end portion 37a, the left wall portion 37c, and the right wall portion 37d, so as to extend rearward. The air-intake duct 21 is inserted from behind into the opening 37b of the front wall portion 37a of the air cleaner holding frame 37, and the flange portion 29, which has a diameter larger than that of the opening 37b, is in contact with a rear surface of the front wall portion 37a.

The air cleaner element 20 includes a base portion 20A that is formed of a sponge element having a concave portion in cross-section that opens toward the air-intake duct 21 and a flange portion 40 that is formed of an annular resin member or an annular metal member attached to a peripheral region of an opening of a front end of the base portion 39. A plurality of mounting holes 40a are formed on the flange portion 40 so as to correspond to mounting holes 29a of the air-intake duct 21, and a plurality of mounting holes (not shown) are formed on the front wall portion 37a so as to correspond to the mounting holes 29a of the air-intake duct 21. With the seal lip 29b of the air-intake duct 21 pressed against the flange portion 40 of the air cleaner element 20, fastener members such as screws are inserted into the mounting holes 29a and 40a of the air-intake duct 21, the air cleaner element 20, and the air cleaner holding frame 37 to allow the air-intake duct 21, the air cleaner element 20, and the air cleaner holding frame 37 to be fastened to each other. Under this condition, an upstream opening (inlet end portion) of the chamber portion 23 is connected to the opening 37b (air outlet) of the air cleaner holding frame 37 forming a part of the air cleaner box 39 and is connected to an opening (air outlet) at a front end of the air cleaner element 20.

In accordance with the above construction, since the extended pipe-shaped portion 22A is provided to extend continuously from the pipe-shaped portion 22 in the interior of the chamber portion 23, the length L1 of the air-intake passage (see FIG. 2) can be made sufficiently long to inhibit turbulent flow, and thus the air can be supplied to the engine smoothly especially during low-speed running of the motorcycle, even when it is difficult to achieve a sufficient whole length of the air-intake duct 21 because of a small distance between the carburetor 19 and the air cleaner 20. In addition, since the chamber portion 23 externally wraps the extended pipe-shaped portion 22A, a volume of the inner space S of the chamber portion 23 can be made larger to reduce an abrupt negative pressure that tends to be generated in the air-intake duct 21 during acceleration of the motorcycle 1. As a result, responsiveness to an acceleration operation is improved during acceleration of the motorcycle 1. Furthermore, since the extended pipe-shaped portion 22A is funnel-shaped to increase the diameter toward the opening end, air existing in the inner space S of the chamber portion 23 is smoothly suctioned into the interior of the extended pipe-shaped portion 22A and is guided to the main passage 34 of the pipe-shaped portion 22. As a result, air-intake resistance can be reduced.

In addition, since the rib 25 is provided between the chamber portion 23 and the extended inner wall portion 24, stiffness of the chamber portion 23 is improved. Therefore, the chamber portion 23 is hardly deformed even if an abrupt negative pressure is generated in the interior of the chamber portion 23 during acceleration of the motorcycle 1. The present invention may be applied to other vehicles such as four-wheeled vehicles instead of the motorcycle described above in this embodiment. In addition, the extended inner wall portion 24 may be of a tubular shape having a circular cross-section, rather than a C-shape in cross-section illustrated in this embodiment.

Figure 7:
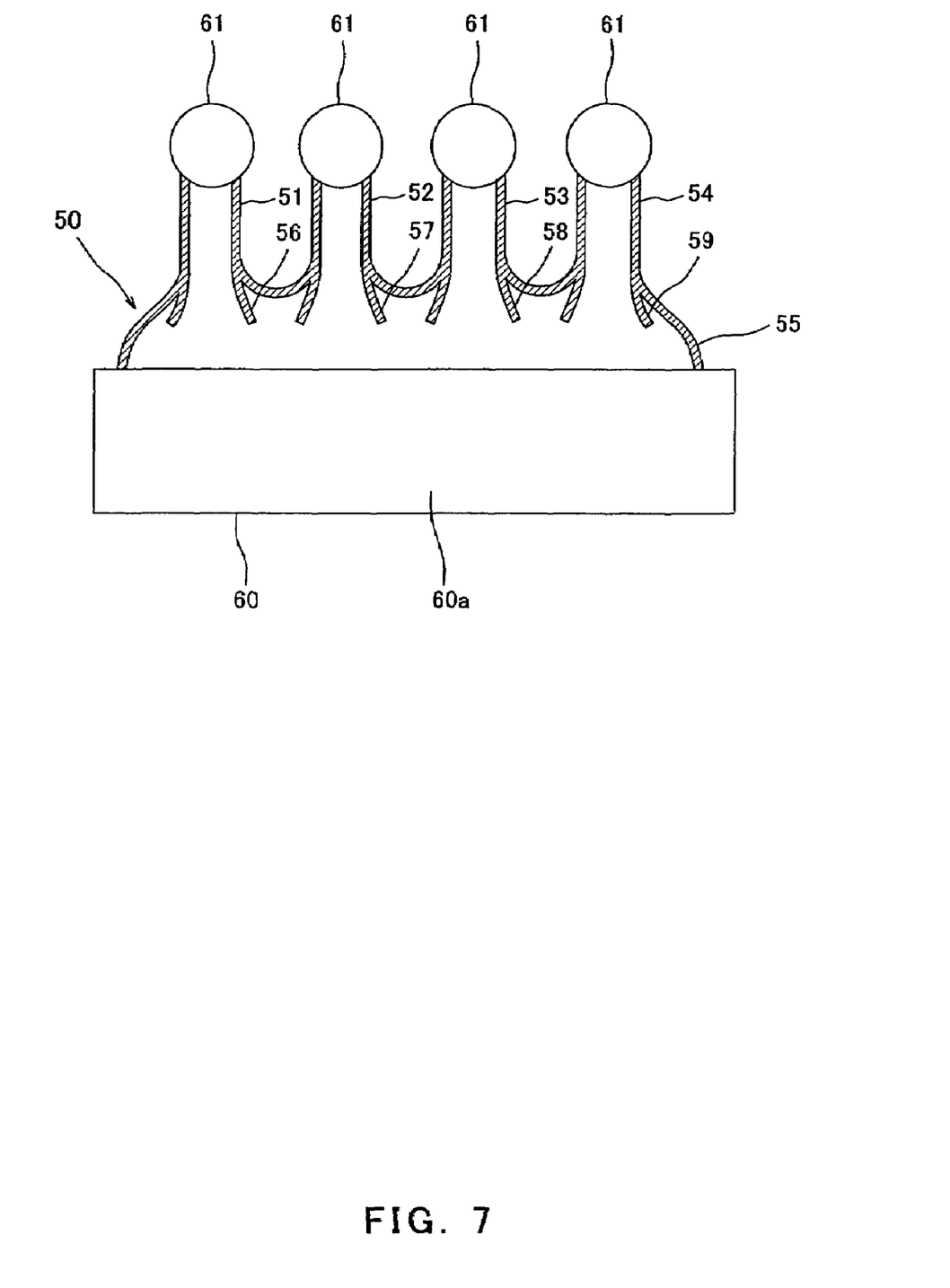
FIG. 7 is a cross-sectional view of an air-intake duct of a motorcycle according to a second embodiment, as viewed from above.

Next, a second embodiment of the present invention will be described. FIG. 7 is a cross-sectional view schematically showing an air-intake duct 50 of the second embodiment. Turning to FIG. 7, in this embodiment, air is supplied from an air cleaner box 60a of an air cleaner 60 of the motorcycle, through the air-intake duct 50, to four carburetors 61 of a motorcycle equipped with an in-line four-cylinder engine. Extended pipe-shaped portions 56 to 59 respectively extend continuously from pipe-shaped portions 51 to 54 and protrude into an inner space of a chamber portion 55 to extend passages of the pipe-shaped portions 51 to 54. The extended pipe-shaped portions 56 to 59 are of a funnel-shape to gradually increase diameters toward their opening ends. The other structure is similar to that of the first embodiment, and will not be further described.

In accordance with the above mentioned construction, the air taken in from outside can be supplied smoothly to the engine during low-speed running, the abrupt negative pressure that tends to be generated in the air-intake duct 50 during acceleration can be well reduced, and responsiveness to the acceleration operation can be improved during acceleration.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An air-intake duct through which air taken in from outside is guided to an air flow rate control device configured to control an amount of air flow that is supplied to an engine of a vehicle, the air-intake duct comprising:
   a pipe-shaped portion that is coupled to the flow rate control device and has an air-intake passage formed therein;
   a chamber portion that is located upstream of the air-intake passage of the pipe-shaped portion in the air flow and has an inner diameter larger than an inner diameter of the pipe-shaped portion; and
   an extended pipe-shaped portion configured to extend continuously from the pipe-shaped portion so as to protrude into an inner space of the chamber portion, the extended pipe-shaped portion forming an extended passage connected to the air-intake passage of the pipe-shaped portion;
   wherein the chamber portion is continuous with and integral with the pipe-shaped portion, and an inlet end portion of the chamber portion is connected to an air outlet of an air cleaner element.

2. The air-intake duct according to claim 1,
   wherein the extended pipe-shaped portion is of a funnel-shape that increases in diameter toward an opening end thereof.

3. The air-intake duct according to claim 2,
   wherein a part of the extended pipe-shaped portion is continuous with an inner surface of the chamber portion.

4. The air-intake duct according to claim 1,
   wherein a rib is provided between an inner surface of the chamber portion and an outer surface of the extended pipe-shaped portion.

5. An air-intake duct through which air taken in from outside is guided to an air flow rate control device configured to control an amount of air flow that is supplied to an engine of a vehicle, the air-intake duct comprising:
   a pipe-shaped portion that is coupled to the flow rate control device and has an air-intake passage formed therein;
   a chamber portion that is located upstream of the air-intake passage of the pipe-shaped portion in the air flow and has an inner diameter larger than an inner diameter of the pipe-shaped portion; and
   an extended pipe-shaped portion configured to extend continuously from the pipe-shaped portion so as to protrude into an inner space of the chamber portion, the extended pipe-shaped portion forming an extended passage connected to the air-intake passage of the pipe-shaped portion;

wherein the pipe-shaped portion has a second air-intake passage that is configured to open in a space formed between the chamber portion and the extended pipe-shaped portion and is connected to the air flow rate control device.

6. An air-intake duct through which air taken in from outside is guided to an air flow rate control device configured to control an amount of air flow that is supplied to an engine of a vehicle, the air-intake duct comprising:

a pipe-shaped portion that is coupled to the flow rate control device and has an air-intake passage formed therein;

a chamber portion that is located upstream of the air-intake passage of the pipe-shaped portion in the air flow and has an inner diameter larger than an inner diameter of the pipe-shaped portion; and an extended pipe-shaped portion configured to extend continuously from the pipe-shaped portion so as to protrude into an inner space of the chamber portion, the extended pipe-shaped portion forming an extended passage connected to the air-intake passage of the pipe-shaped portion;

wherein the chamber portion is continuous with and integral with the pipe-shaped portion and an inlet end portion of the chamber portion is connected to an air outlet of an air cleaner box that accommodates an air cleaner element.

7. A motorcycle comprising an air-intake duct coupling a flow rate control device to an air cleaner to allow air taken in from outside to be guided from the air cleaner to the air flow control device, the air flow control device being configured to control an amount of air flow that is supplied to an engine, the air-intake duct including:

a pipe-shaped portion that is coupled to the flow rate control device and has an air-intake passage formed therein;

a chamber portion that is located upstream of the air-intake passage of the pipe-shaped portion in the air flow and has an inner diameter larger than an inner diameter of the pipe-shaped portion; and an extended pipe-shaped portion configured to extend continuously from the pipe-shaped portion so as to protrude into an inner space of the chamber portion, the extended pipe-shaped portion forming an extended passage connected to the air-intake passage of the pipe-shaped portion;

wherein the chamber portion is configured to open in a direction in which the extended pipe-shaped portion protrudes, and the air taken in from outside flows in the chamber portion and the extended pipe-shaped portion such that the air is guided substantially along a passage axis of the chamber portion and the extended pipe-shaped portion; and wherein the air-intake duct is formed as a unitary one-piece component made of flexible material.

8. A motorcycle comprising an air-intake duct coupling a flow rate control device to an air cleaner to allow air taken in from outside to be guided from the air cleaner to the air flow control device, the air flow control device being configured to control an amount of air flow that is supplied to an engine, the air-intake duct including:

a pipe-shaped portion that is coupled to the flow rate control device and has an air-intake passage formed therein;

a chamber portion that is located upstream of the air-intake passage of the pipe-shaped portion in the air flow and has an inner diameter larger than an inner diameter of the pipe-shaped portion; and an extended pipe-shaped portion configured to extend continuously from the pipe-shaped portion so as to protrude into an inner space of the chamber portion, the extended pipe-shaped portion forming an extended passage connected to the air-intake passage of the pipe-shaped portion;

wherein the chamber portion is configured to open in a direction in which the extended pipe-shaped portion protrudes, and the air taken in from outside flows in the chamber portion and the extended pipe-shaped portion such that the air is guided substantially along a passage axis of the chamber portion and the extended pipe-shaped portion; and wherein the chamber portion is continuous with and integral with the pipe-shaped portion, and an inlet end portion of the chamber portion is connected to an air outlet of an air cleaner element.

9. The motorcycle according to claim 8,
wherein the extended pipe-shaped portion is of a funnel-shape that increases in diameter toward an opening end thereof.

10. The motorcycle according to claim 9,
wherein a part of the extended pipe-shaped portion is continuous with an inner surface of the chamber portion.

11. The motorcycle according to claim 8,
wherein a rib is provided between an inner surface of the chamber portion and an outer surface of the extended pipe-shaped portion.

12. A motorcycle comprising an air-intake duct coupling a flow rate control device to an air cleaner to allow air taken in from outside to be guided from the air cleaner to the air flow control device, the air flow control device being configured to control an amount of air flow that is supplied to an engine, the air-intake duct including:

a pipe-shaped portion that is coupled to the flow rate control device and has an air-intake passage formed therein;

a chamber portion that is located upstream of the air-intake passage of the pipe-shaped portion in the air flow and has an inner diameter larger than an inner diameter of the pipe-shaped portion; and an extended pipe-shaped portion configured to extend continuously from the pipe-shaped portion so as to protrude into an inner space of the chamber portion, the extended pipe-shaped portion forming an extended passage connected to the air-intake passage of the pipe-shaped portion;

wherein the pipe-shaped portion has a second air-intake passage that is configured to open in a space formed between the chamber portion and the extended pipe-shaped portion and is connected to the air flow rate control device; and wherein the chamber portion is configured to open in a direction in which the extended pipe-shaped portion protrudes, and the air taken in from outside flows in the chamber portion and the extended pipe-shaped portion such that the air is guided substantially along a passage axis of the chamber portion and the extended pipe-shaped portion.

13. A motorcycle comprising an air-intake duct coupling a flow rate control device to an air cleaner to allow air taken in from outside to be guided from the air cleaner to the air flow control device, the air flow control device being configured to control an amount of air flow that is supplied to an engine, the air-intake duct including:
- a pipe-shaped portion that is coupled to the flow rate control device and has an air-intake passage formed therein;
- a chamber portion that is located upstream of the air-intake passage of the pipe-shaped portion in the air flow and has an inner diameter larger than an inner diameter of the pipe-shaped portion; and
- an extended pipe-shaped portion configured to extend continuously from the pipe-shaped portion so as to protrude into an inner space of the chamber portion, the extended pipe-shaped portion forming an extended passage connected to the air-intake passage of the pipe-shaped portion;
- wherein the chamber portion is configured to open in a direction in which the extended pipe-shaped portion protrudes, and the air taken in from outside flows in the chamber portion and the extended pipe-shaped portion such that the air is guided substantially along a passage axis of the chamber portion and the extended pipe-shaped portion; and
- wherein the chamber portion is continuous with and integral with the pipe-shaped portion and an inlet end portion of the chamber portion is connected to an air outlet of an air cleaner box that accommodates an air cleaner element.

14. An air-intake duct through which air taken in from outside is guided to an air flow rate control device configured to control an amount of air flow that is supplied to an engine of a vehicle, the air-intake duct comprising:
- a pipe-shaped portion that is coupled to the flow rate control device and has an air-intake passage formed therein;
- a chamber portion that is located upstream of the air-intake passage of the pipe-shaped portion in the air flow and has an inner diameter larger than an inner diameter of the pipe-shaped portion; and
- an extended pipe-shaped portion configured to extend continuously from the pipe-shaped portion so as to protrude into an inner space of the chamber portion, the extended pipe-shaped portion forming an extended passage connected to the air-intake passage of the pipe-shaped portion;
- wherein the air-intake duct is formed of a unitary one piece made of flexible material.

15. An air-intake duct through which air taken in from outside is guided to an air flow rate control device configured to control an amount of air flow that is supplied to an engine of a vehicle, the air-intake duct comprising:
- a pipe-shaped portion that is coupled to the flow rate control device and has an air-intake passage formed therein;
- a chamber portion that is located upstream of the air-intake passage of the pipe-shaped portion in the air flow and has an inner diameter larger than an inner diameter of the pipe-shaped portion; and
- an extended pipe-shaped portion configured to extend continuously from the pipe-shaped portion so as to protrude into an inner space of the chamber portion, the extended pipe-shaped portion forming an extended passage connected to the air-intake passage of the pipe-shaped portion;
- wherein the chamber portion is configured to open in a direction in which the extended pipe-shaped portion protrudes, and the air taken in from outside flows in the chamber portion and the extended pipe-shaped portion such that the air is guided substantially along a passage axis of the chamber portion and the extended pipe-shaped portion; and
- wherein the air-intake duct is formed of a unitary one piece made of flexible material.

* * * * *